United States Patent [19]
Greenly

[11] 3,849,910
[45] Nov. 26, 1974

[54] TRAINING APPARATUS FOR FIREARMS USE

[75] Inventor: Robert B. Greenly, Sunnyvale, Calif.

[73] Assignee: The Singer Company, Binghamton, N.Y.

[22] Filed: Feb. 12, 1973

[21] Appl. No.: 332,036

[52] U.S. Cl. .............................. 35/25, 273/105.1
[51] Int. Cl. .................................... F41g 3/26
[58] Field of Search .......... 35/25; 273/101.1, 101.2, 273/102.2 RB; 235/61.6; 250/215; 178/18 T

[56] References Cited
UNITED STATES PATENTS

| | | | |
|---|---|---|---|
| 1,035,811 | 8/1912 | Paterson | 273/102.2 |
| 1,197,567 | 9/1916 | Weeks | 273/105.1 |
| 2,404,653 | 7/1946 | Plebanek | 273/101.1 |
| 3,061,727 | 10/1962 | Roth et al. | 273/102.2 B |
| 3,590,225 | 6/1971 | Murphy | 273/102.2 R |

*Primary Examiner*—Wolff, J. H.
*Attorney, Agent, or Firm*—James C. Kesterson; J. Ronald Richbourg; Jeffrey Rothenberg

[57] ABSTRACT

Training apparatus designed to train personnel in the use of firearms by simulating situations requiring the rapid exercise of judgment and accuracy. A screen, penetrable by a projectile, is disposed for displaying target images projected thereon by a cine projector. Electromagnetic radiation directed towards one side of the screen passes through any apertures made therein by projectiles and is detected to generate electrical signals indicative of the location of such apertures. Reference electrical signals are generated which define a target area within the target images, and a comparison means is provided for determining the degree of correlation between the location of the aperture and the defined target area. A memory addressable by the various frames of cine film moving in the projector may be employed for generating the reference electrical signals. Electronic circuitry is provided for measuring the amount of time used by a trainee to respond to a given target image.

17 Claims, 7 Drawing Figures

TRAINING APPARATUS FOR FIREARMS USE

BACKGROUND OF THE INVENTION

1. Field of the Invention

The system of the present invention relates generally to training devices and, more particularly, to a marksmanship scoring device with provisions for evaluating judgment as to when a firearm should be used and for measuring trainee reaction time.

2. Description of the Prior Art

Inasmuch as the use of firearms is inherently dangerous, there are obvious advantages in training personnel in their proper and accurate use. In the past a great deal of emphasis has been placed on training personnel with respect to accuracy in the use of firearms; however, a need exists for a device to train personnel not only with respect to accuracy, but also with respect to the judgment as to when a firearm should be used in particular situations or against particular targets. For example, a law enforcement officer should be trained to use his firearm is apprehending criminals where it appears reasonably necessary to employ deadly force; a soldier should be trained to use his firearm against the enemy, and not inadvertently against friendly forces as sometimes occurs in poor visibility situations. In addition, it is advantageous for hunters to be trained to use firearms for killing game, and not their fellow hunters of farm animals.

A well-known means for training personnel for accuracy in the use of firearms is the conventional patch-type target customarily used on pistol and rifle ranges. Primary disadvantages of this type of marksmanship training are lack of realism, the need for manual methods of scoring, and the lack of consideration for response time and judgement in the evaluation of trainee performances.

In an attempt to improve marksmanship training, devices have been developed which employ electrical and electronic components to measure the accuracy with which a simulated firearm is aimed. These devices operate on the principle that if the simulated firearm is properly aimed at a target, an indication of a hit is recorded. Electrical synchro systems are employed to detect any error in aiming at a target, and a miss is detected by a differential transformer if the simulated firearm is improperly aimed. One example of this type of device, frequently seen in amusement parks and penny arcades, electrically evaluates the marksmanship of the user who aims the simulated firearm at silhouettes of ducks and the like.

During the Korean conflict a gunnery trainer for B-29 and B-50 gunners was constructed which employed an analog computer in a manner similar to the prior art electrical synchro system described hereinabove. An image of a target was projected onto a screen, and a gun-sighting unit was aimed at the projected targets. The gun-sighting unit was electrically synchronized with the target projection unit. An error measuring device, which was electrically responsive to the movement of the sighting unit, produced a voltage representative of any error between the user's aiming point and the projected image of the target. The marksmanship of the user was scored by recording the number of hits and the amount of time the user actuated the trigger. A distinct disadvantage of the two prior art devices described hereinabove is their lack of simulation realism.

Another marksmanship scoring device currently in use detects a bullet striking a target by the use of a vibration-sensitive piezo-electric element and an electronic impedance transformer. One such system is the SAAB BT-14 Automatic Hit Scoring System, which is manufactured by SAAB Aktiebolag, Linkoping, Sweden. A primary disadvantage of this prior art device is that it does not provide an accurate hit assessment of the bullet, but instead produces a remote impact detection of the bullet striking the general target area. A further disadvantage of the SAAB system is that it is primarily intended for use in aircraft gunnery practice, wherein the target is relatively large in size. A general disadvantage of the prior art devices, as discussed hereinabove, is that they are lacking in a practical and economical method for accurately and rapidly providing for target hit measurements when the target is in motion; and they are likewise lacking in target realism relative to an actual shooting situation.

More recently, devices have been developed for scoring marksmanship by detecting coordinate locations of bullet penetrations into a target area by the use of a grid of sensing wires embedded in the target. The sensing wires are electrically connected to a diode matrix, and a coordinate location of a bullet hitting the target is determined by the electrical "shorting out" of the wires in the target by the bullet. A primary disadvantage of this device is that live ammunition may not be used since the target would be quickly rendered inoperative and eventually destroyed by live ammunition. This device is designed to operate in response to plastic bullets or the like, and is, therefore, lacking in an accurate simulation of the use of firearms with live ammunition.

A relevant prior art device is disclosed in U.S. Pat. No. 3,402,933 for a "Marksmanship Training Target Film" of D. E. De Vogelaere. This device employs a cine film projector and a screen made of a projectile penetrable material, such as paper. The projectiles employed in this device do not constitute live ammunition, by employ a light-weight modified projectile in lieu of a lead slug. Therefore, this device is lacking in a realistic simulation of firearms use. The marksmanship of the trainee is scored by visually examining the screen material following each firing. This method is the same as that used with the conventional rifle and pistol range targets discussed hereinabove, and lacks means for automatically scoring the trainee's marksmanship; moreover, it does not measure response time nor judgment in the use of the weapon.

A practical system for training personnel in the use of firearms in accordance with the present invention permits the use of live ammunition and additionally provides means for automatically measuring marksmanship scores, trainee reaction time, and overall trainee performance. The device of the present invention mitigates the disadvantages of the prior art devices by presenting images which are realistic in appearance of moving target situations for firearms use.

SUMMARY OF THE INVENTION

The present invention contemplates a training apparatus for firearms use comprising a display screen made of a material which is penetrable by projectiles, and an image projector for projecting target scenes onto the screen. A source of electromagnetic radiation is disposed on one side of the screen to transit radiation through any projectile apertures made in the screen, and a detection means responsive to the radiation is disposed on the other side of the apertures. A data storage means is provided for storing reference coordinate locations of the target areas of the scenes to be displayed, and a comparator is coupled between the detection means and the storage means to provide electrical signals indicative of the degree of correlation between the aperture coordinate locations and the reference coordinate locations. Electronic circuitry is provided for addressing the memory in synchronization with the individual scenes displayed, and to synchronize the detection means to the comparator. Additional electronic circuitry is provided for determining the total number of times a firearm is used and the amount of time required for the trainee to respond to any given target situation. A second data storage means is also provided for storing coordinate location values of all previous apertures.

Accordingly, it is a fundamental object of the present invention to provide a novel firearms training device which overcomes or mitigates the problems of the prior art as outlined above.

It is another object of this invention to provide a system for training marksmen which includes means for displaying realistic appearing scenes of moving target situations programmable according to the needs of the trainee.

It is still another object of this invention to provide an indication of a trainee marksmanship rating while the trainee has a fresh mental picture of his actions.

It is a still further object of this invention to provide a measure of the time in which each trainee reacts to a shooting situation.

Still another object of this invention is to provide a rating indicative of the judgement exercised by the trainee in using his firearm.

A still further object is the provision of a training device as characterized in the preceding objects which is simple in construction, reliable in operation, and low in cost.

A feature of the system of the present invention resides in the provision of image projections of various target situations in combination with electronic measurements means for providing marksmanship ratings and reaction time scorings, and evaluation of trainee judgment.

An advantage of the system of the present invention is that live ammunition and conventional handguns or rifles may be employed in conjunction with filmed enactments of target situations which require that the trainee exercise prudence in the use of his firearm.

These and other objects, features, and advantages of the present invention will be exemplified in the construction hereinafter set forth; the scope of the invention will be indicated in the subjoined claims.

DESCRIPTION OF THE PREFERRED EMBODIMENT

Figure 1:
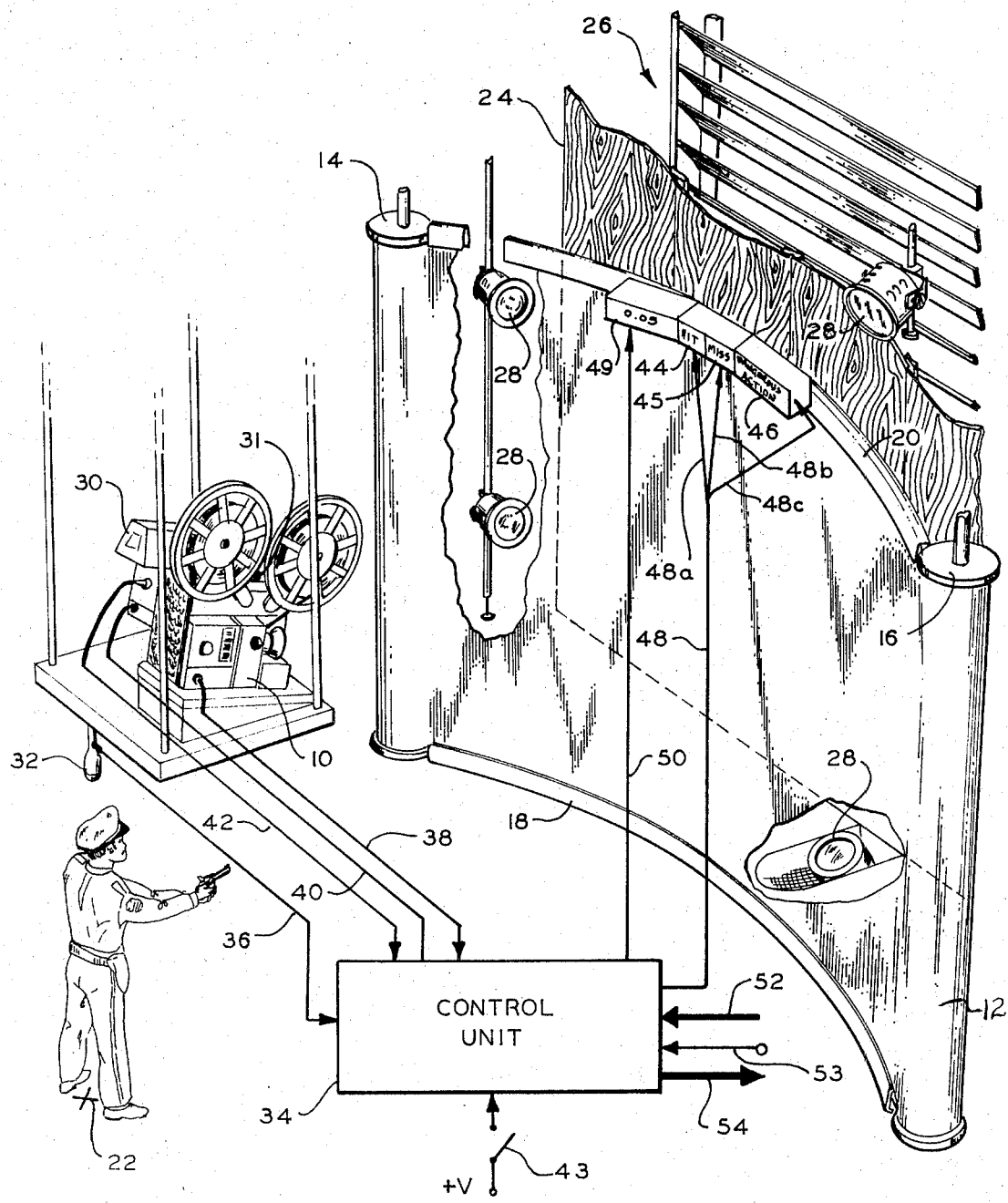
FIG. 1 is a perspective view of the system of the present invention.

Referring now to the drawings and, first in particular to FIG. 1, there is illustrated a perspective view of the system of the present invention which includes a motion picture projector 10 and a screen 12 for displaying scenes of firearms use situations. In accordance with a specific embodiment, projector 10 may be any commercially available motion picture projector with provision for an electrical output signal indicative of frame advancement. It is pointed out that the invention contemplated is not restricted to the use of a motion picture projector. Other image display devices, such as a slide projector, may be suitable for displaying target scenes. It is also possible to omit the image projection means and employ a screen having targets drawn or printed directly thereon.

Screen 12 may comprise a discardable material which is penetrable by a projectile. A preferred material suitable for the screen is a roll of seamless photographer's backdrop paper. This provides for a screen reflectance of approximately 80 percent, and thereby allows projection of most images under ambient light conditions. The screen material may be disposed on a supply reel 14 and a take-up reel 16. However, a single sheet of material may be used for screen 12 and conventional patching techniques may be employed to cover up previous projectile apertures in the screen.

The nature and design of the present invention, with emphasis on the reality of the scenes projected, requires that a field-of-view be provided which is comparable to that of the human eye. The screen is formed into a partial-cylinder surface by means of a curved lower channel 18 and a similarly curved upper channel 20. A preferred size for screen 12 is 8 feet high and 22 feet wide. A trainee shooting station 22 is located approximately 15 feet from the center of screen 12, which corresponds to the geometric center of the cylinder defining the shape of the screen.

A projectile splashboard 24, which may be constructed of plywood, is located behind screen 12. A metal projectile deflecting means 26 is located behind splashboard 24, which may be constructed of a plurality of steel plates arranged angularly to the line of projectile travel. A projectile pierces the splashboard and is deflected downwardly by the deflecting means to a sand trap (not shown). The splashboard eliminates any backsplatter caused by a bullet striking a hard surface, viz., the projectile deflecting means 26. A plurality of light sources 28 are located between screen 12 and splashboard 24. The light sources are disposed for directing electromagnetic radiation toward the back surface of the screen, and are positioned out of the line of projectile fire.

A television camera 30 is disposed as a detection means for electronically scanning the image of screen 12 to enable determination of the coordinate location of any apertures made in the screen. Camera 30 may comprise a conventional vidicon tube similar to that described in detail on page 257 in "Television," second edition, by V. K. Zworykin and G. A. Morton. Generally an image is focused by a set of lenses onto a plate within the camera, which plate contains a layer of photoconductive material. An electron beam is generated by scanning, in a raster fashion, the opposite side of the plate. A voltage is generated in response to the electron beam impinging upon one side of the plate and light from the image focused onto the other side thereof.

In order for camera 30 to enable the determination of the coordinate location of any apertures made in the screen, a time-and-space synchronization of the scanning operation must be established. If the amount of time required for the electron beam of the camera to travel across a single horizontal scan of the plate within the camera is divided into a finite number of discrete intervals, then spatial positions of the beam can be assigned to these discrete intervals as a function of time. These spatial positions will hereafter be referred to as "elements," and they constitute increments of the $x$ axis. Each horizontal scan of the plate within the camera constitutes increments of the $y$ axis, and will hereafter be referred to as a "scan-line."

Conventional vidicon cameras (or those adapted to the U.S. Broadcasting Standards) are designed to operate with 525 scan-lines in each one-thirtieth of a second with approximately 250 tonal alternations (elements) per scan-line, which results in a bandwidth of 4 MHz (4,000,000 elements per second). However, according to a specific embodiment, camera 30 is controlled externally to operate with 512 scan-lines in each one-thirtieth of a second with 512 elements per scan-line which results in a bandwidth of nearly 8 MHz. As will be shown hereinbelow, the use of 512 scan-lines and elements instead of 525 scan-lines and elements enables the use of less complicated digital circuitry.

In the alternative, a solid-state detection means may be employed in lieu of camera 30. These solid-state devices comprise a plurality of photosensors disposed in a two-dimensional array. For the specific implementation disclosed herein, 262,144 individual photosensors would be required, which photosensors would be arranged in a two-dimensional array of 512 rows of 512 photosensors per row. More particularly, each photosensor would constitute an element, and each row of 512 photosenors would constitute a scan-line. At the present time such a two-dimensional array is not commercially available on the market. However, smaller arrays are presently available; for example a 120-element photosensor (or phototransistor) array, type TIL137, is manufactured by Texas Instruments, Inc. of Dallas, Texas. At the time of this writing, these photosensor arrays are still in the early post-development phase and are not, as yet, economically competitive with a vidicon when scanning an area as large as the display screen.

Projector 10 and camera 30 are positioned above trainee shooting station 22. Camera 30 is aligned optically to receive an image from an area of the screen coincident with the area on which target scenes are displayed by the projector. More particularly, the elements and scan-lines of the image received by camera 30 are in alignment with corresponding positions of the image displayed by projector 10. The relationship between reference coordinate locations and target scenes will become clearer following the description hereinbelow accompanying FIG. 2.

When an aperture is made in screen 12 as a result of a trainee firing his weapon at a target displayed on the screen, radiation from sources 28 passes through the aperture and is detected by the camera. The camera can detect any one of 262,144 (512 × 512) different locations at which an aperture is made in the screen, and each of these locations can be determined by counting the element and the scan-line at which the camera detects the radiation. The camera generates a signal in response to detecting radiation passing through an aperture, and this signal will hereafter be referred to as an APERTURE-DETECTION signal.

In accordance with a preferred embodiment, radiation emitted from sources 28 is restricted to that having wavelengths which reside within the infrared region (viz., 6,000 to 9,000 Angstroms). An infrared light filter 31 is affixed to the lens of camera 30, which enables the camera to accept light having wavelengths only within the infrared region and to reject all other light. That is, ambient light and light from the illumination of the projected images will be rejected by the infrared light filter 31. The use of infrared light in sources 28 and filter 31 effects a more independent and reliable determination of aperture locations by camera 30. Note that a vidicon tube should be employed within the camera that is adequately responsive to infrared light. One such vidicon tube is a type Z-7975, also known by the trademark of Epicon, and is manufactured by General Electric of Syracuse, New York. This tube has a high spectral response for light having wavelengths residing within the infrared region.

Alternatively, light sources 28 may comprise ordinary incandescent lights which emit radiation having a multiplicity of disparate wavelengths residing throughout the light spectrum. For this substitution of light sources, it is necessary that the scanning operation of camera 30 be synchronized with the shutter operation of projector 10 to eliminate detection of unwanted projected image light by the camera. More particularly, the camera should be synchronized to scan the image from the screen only during the time interval between frames of the projected scenes; that is, when the film projection illumination means is blocked by the shutter. This requires additional synchronization circuitry to insure that erroneous marksmanship ratings are not produced as a result of extraneous light detections by the camera. Therefore, in accordance with a specific embodiment, simplicity of implementation is effected by employing infrared light within sources 28 and infrared light filter 31 on the lens of camera 30.

A microphone 32 is disposed in the vicinity of shooting station 22 for detecting the sound of the blast of a firearm, and the microphone is electrically coupled to a control unit 34 by means of a line 36. Projector 10 provides FILM-MOVEMENT-SYNCHRONIZATION signals to control unit 34 by means of a line 38. These synchronization signals may be generated within projector 10 by detecting revolutions of the sprocket to which the film is held in close registration. START-SCAN, STOP-SCAN, and SCAN-SYNCHRONIZATION signals are supplied to camera 30 by means of lines 40 from control unit 34. A video signal, which is provided in response to the scanning operation of camera 30, is supplied to control unit 34 by means of a line 42. A switch 43 is connected between a voltage source and control unit 34 to supply a RESET signal to the circuitry within the control unit.

Indicators 44, 45, and 46 are activated by signals from control unit 34, which signals are conducted by means of lines 48a, 48b, and 48c (also generally referred to herein as lines 48). Indicator 44 is employed for a HIT indication and represents that the trainee has caused a projectile to pass through a defined target area; indicator 45 is employed for a MISS indication and represents that the trainee has responded in an area close to the defined target area; and indicator 46 is employed for a DANGEROUS ACTION indication and represents a trainee's response which missed the target area. For example, a HIT is defined as those areas where a preferred response should be made; a MISS is defined as those areas in which a response would be considered satisfactory but not preferred; and a DANGEROUS ACTION is defined to include all areas other than those previously designated. The target areas will be explained in greater detail with the description accompanying FIG. 2. A digital-display indicator 49 is provided for displaying the amount of elapsed time used by the trainee for responding to a particular target scene displayed on the screen. Indicator 49 is coupled to control unit 34 by means of lines 50. A preferred digital display suitable for indicator 49 is one that displays time decimally in seconds and decimal fractions thereof.

Target area coordinate location values are entered into a memory within control unit 34 from the optional external equipment by means of lines 52. These values are entered into the memory prior to operation, and the values define the target areas within the scenes to be projected. The memory is addressed for this operation in response to signals supplied on line 53. The output of a counter, which is disposed in the control unit for counting the number of shots fired by a trainee, is supplied on lines 54 for activation of an optional display (not shown), or for use in the optional external equipment. Control unit 34 and the associated control signals will be explained in greater detail with the description hereinbelow accompanying FIG. 3.

In operation, scenes are projected onto screen 12 by means of projector 10, and target-situation scenes are thereby presented for a trainee's response. Control unit 34 is operated in synchronization with the scenes projected by the application of the FILM-MOVEMENT-SYNCHRONIZATION signals to the control unit via line 38. These synchronization signals enable the generation of addresses to the memory within the control unit.

When a trainee fires his weapon, the sound is detected by microphone 32 and a START-RATING signal from the microphone is supplied to control unit 34 by means of line 36. An aperture is made in screen 12 at a coordinate location which corresponds positionally to the result of the trainee's firing his weapon at the target areas within the scene displayed, and infrared light from source 28 is passed through the aperture. In response to the START-RATING signals, the START-SCAN signal is supplied from control unit 34 to camera 30 by means of one of lines 40 to initiate the scanning operation of the camera. The scanning operation of the camera is synchronized to the operation of the control unit by the application of the SCAN-SYNCHRONIZATION signals via lines 40.

When the electron beam within the camera intercepts the element of the scan-line corresponding to the coordinate location of the aperture made in the screen, a high-amplitude pulse of the video signal is supplied from the camera to control unit 34 by means of line 42. A comparison operation is performed within the control unit 34 between reference coordinate locations stored in the memory and the coordinate location detected by the scanning operation of camera 30 to determine location(s) at which there is a correlation between the aperture(s) and defined target areas. The result of this comparison operation is supplied on one of line 48a, 48b, or 48c to one of indicators 44, 45, or 46, respectively.

Figure 2:
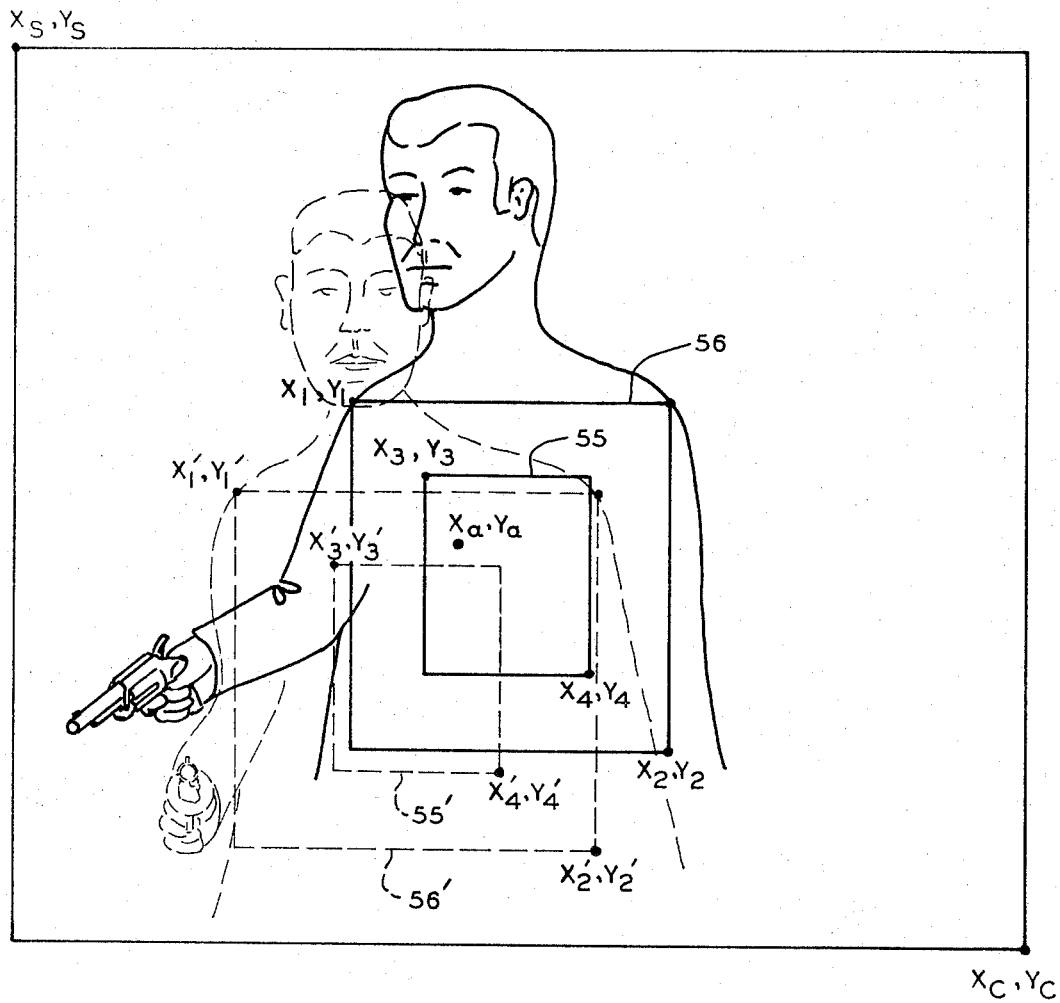
FIG. 2 is a diagram of an exemplary target scene.

At this juncture of the description, reference is made to the diagram in FIG. 2 which illustrates an exemplary target scene. The target area that is specifically defined as a HIT is included within rectangle 55. The particular target area that is defined as a MISS is included within rectangle 56 and without rectangle 55. The particular target area that is defined as a DANGEROUS ACTION is without rectangle 56. The coordinate location $x_s$, $y_s$ defines the point at which the scanning operation starts; and the coordinate location $x_c$, $y_c$ defines the point at which the scanning operation is completed. Intermediate coordinate locations $x_1$, $y_1$ and $x_2$, $y_2$ define rectangle 56; and intermediate coordinate locations $x_3$, $y_3$ and $x_4$, $y_4$ define rectangle 55.

Assume, for example, that coordinate location $x_a$, $y_a$ represents an aperture made in the screen as a result of a trainee firing his weapon at the exemplary target scene. Camera 30 supplies the high-amplitude video signal to control unit 34 when the electron beam within the camera intercepts element $x_a$ of a scan line $y_a$. The comparison operation performed within the control unit compares coordinate location $x_a$, $y_a$ with the stored coordinate locations $x_1$, $y_1$; $x_2$, $y_2$; $x_3$, $y_3$; and $x_4$, $y_4$, and supplies a rating signal on lines 48. The comparison operation may be expressed mathematically as follows:

$$\text{HIT} = (x_a \geq x_3 \text{ AND } x_a \leq x_4) \text{ AND } (y_a \geq y_3 \text{ AND } y_a \leq y_4) \tag{1}$$

$$\text{MISS} = (x_a \geq x_1 \text{ AND } x_a \leq x_2) \text{ AND } (y_a \geq y_1 \text{ AND } y_a \leq y_2) \text{ AND } \overline{\text{HIT}} \tag{2}$$

$$\text{DANGEROUS ACTION} = \overline{\text{HIT}} \text{ AND } \overline{\text{MISS}} \tag{3}$$

wherein an overscore in the equations indicates that the function is NOT present. The details of the comparison operation will be explained in greater detail hereinbelow.

As alluded to hereinabove, the system of the present invention displays targets that move with respect to the position of the trainee. This is effected by projecting motion pictures of sequences of scenes which may or may not require that a trainee use his firearm. The individual target areas change as a result of the target subject itself moving. The rectangle depicted by dashed line 56' illustrates the movement of rectangle 56 to a new position; and likewise, the rectangle depicted by dashed line 55' illustrates the movement of rectangle 55 to a new position. The values for the coordinate locations $x_1'$, $y_1'$; $x_2'$, $y_2'$; and $x_3'$, $y_3'$; $x_4'$, $y_4'$, are the new coordinate location values for rectangles 56' and 55', respectively. These values are changed by changing the address value to the memory within the control unit. Note that if the aperture at $x_a$, $y_a$ were made while the target areas were in the new position as defined by rectangles 55' and 56', a rating of a MISS would be made. It is pointed out at this juncture that if continuous target movement is not critical for a given training exercise, a slide projector may be used in lieu of projector 10. This substituted projection means will be described hereinbelow under SECOND EMBODIMENT OF THE PRESENT INVENTION.

Figure 3:
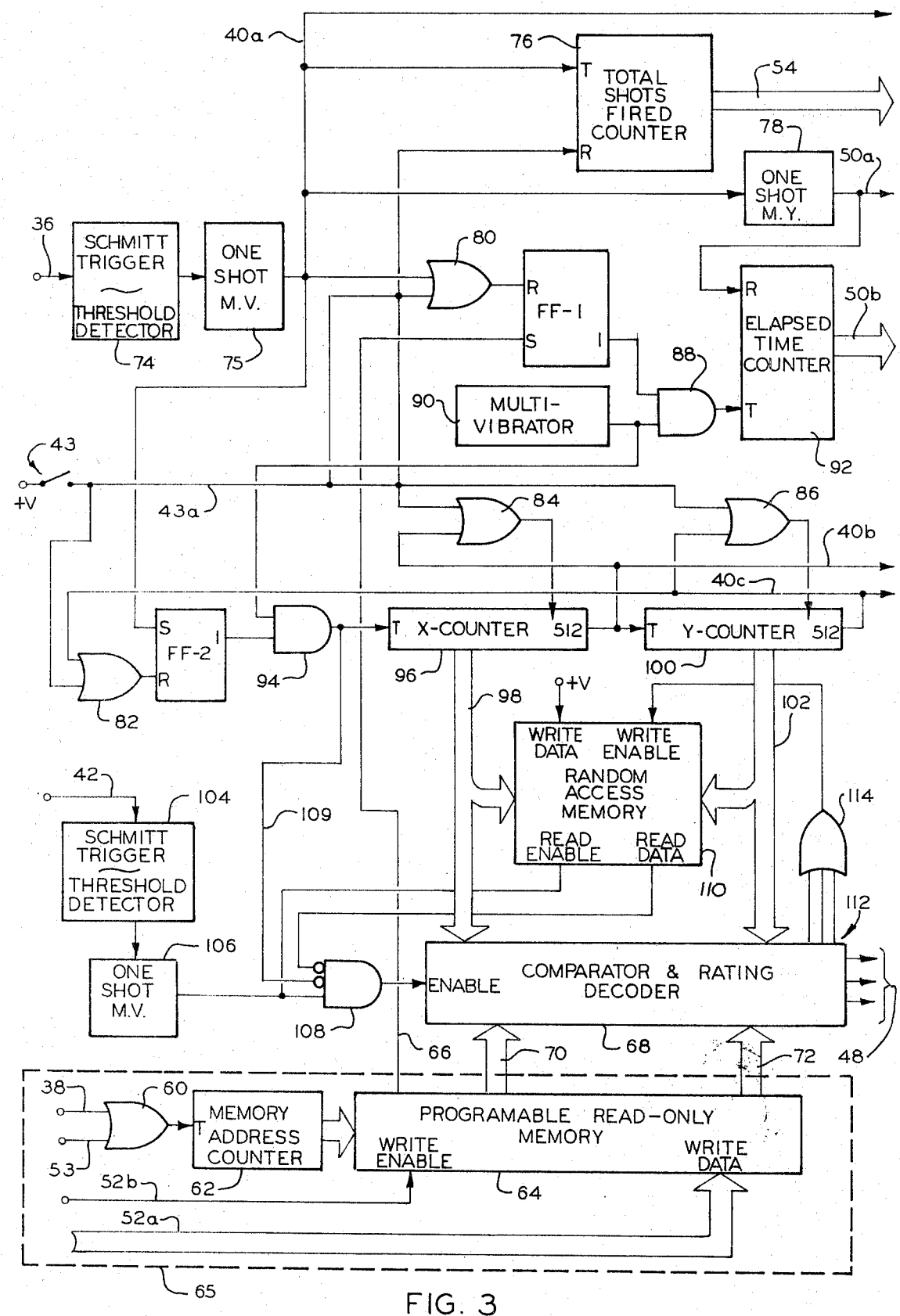
FIG. 3 is a logic-block diagram of the circuitry of the present invention.

With reference to FIG. 3, control unit 34 is shown in greater detail. Line 38, which conducts the FILM-MOVEMENT-SYNCHRONIZATION signals, is connected to one of two inputs of an OR gate 60. The second input to OR gate 60 is connected to line 53 from the optional external equipment. The output of OR gate 60 is connected to the toggle input of a memory address counter 62. Counter 62 may comprise a conventional binary counter, and is employed herein for providing sequential addresses to a programmable-read-only memory (PROM) 64. There are numerous types of PROM's presently available on the market. These PROM's have capabilities of providing preprogrammed binary numbers at an output thereof in response to address input binary numbers. A unique feature of a PROM is the capability of storing a multiplicity of addressable binary numbers which may be retrieved from the memory without erasing the original value stored therein; and the particular values for the binary numbers may be changed by means of external programming. One example of a PROM suitable for use within the present invention, is a 2048-BIT Semi-Conductor Memory Array, Model No. SMA 1001, manufactured by Texas Instruments, Inc. of Dallas, Texas.

It is pointed out that a PROM is one of many types of memories suitable for use as memory 64. Other types of memories, such as magnetic disc, drum, tape, or a core storage may be used for satisfactory operation of the invention contemplated herein. The reference coordinate location values could also be recorded directly on the film adjacent to the corresponding film frame in a manner similar to that of recording and reading blocks of digital data on film. A data tab card could also be used for storing reference coordinate location values, wherein each data tab card contains the values for a given frame on the film. Data tab cards would be particularly suitable where a slide projector is used in lieu of a motion picture projector since a data tab card reader and a slide projector both operate incrementally. The use of a data tab card reader would alter the structure of the storage means indicated in FIG. 3 by dashed line 65. The alternate structure will be explained in greater detail with the description accompanying FIG. 7.

The values for the particular binary numbers to be stored in memory 64 are supplied from external optional equipment by means of lines 52a; and a signal is likewise provided on line 52b to the "write-enable" input of memory 64 to enable entry of the new binary number values supplied on lines 52a. Address counter incrementation signals are supplied during preoperation programming, from external optional equipment, on line 53 to select the address within memory 64 at which the new binary numbers are to be stored.

Memory address counter 62 may be omitted if address values are applied directly to memory 64. Two exemplary alternatives will be described. First, the film could contain encoded binary numbers indicative of memory addresses which could be read either optically or magnetically within the projector. Techniques such as this are well-known in the art and are analogous to reading blocks of digital data on film. Secondly, projector 10 could employ a device as disclosed in co-pending application Ser. No. 210,444, now U.S. Pat. No. 3,793,508, for a "Film Frame Counter" of Charles R. Maggi, filed Dec. 21, 1971 and issued Feb. 19, 1974.

In programming the system of the present invention, reference coordinate location values for individual target situations to be displayed are entered into memory 64 from the optional external equipment in the form of binary data. It is noted that the addresses to the memory correspond to the frames of the film employed in projector 10. Therefore, when binary data are entered into memory 64 they are stored in memory locations which correspond to the frames of the film. This is effected by addressing memory 64 during the preoperation programming with the same address counter 62 that is employed for addressing the memory when retrieving memory output binary data during normal operation.

The binary numbers provided at the output of memory 64 are subdivided into three categories. The first category is a single binary digit supplied on line 66, which line is connected to the set input of a flip-flop FF-1. The second category comprises the $x$ reference coordinates (viz., $x_1$, $x_2$, $x_3$, and $x_4$) of the target areas described hereinabove and illustrated in FIG. 2. This binary number is supplied to a first $x$-value compare input of a digital comparator 68 by means of lines 70. The third category of binary numbers comprises the $y$ reference coordinates (viz., $y_1$, $y_2$, $y_3$, and $y_4$) of the target areas illustrated in FIG. 2. This binary number of supplied to a first $y$-value compare input of comparator 68 by means of line 72.

Line 36 from microphone 32 is connected to the input of a Schmitt trigger 74, which is employed herein as a threshold detector. Trigger 74 has the function herein of discriminating between voltages from the microphone indicative of normal environment sounds and that indicative of the sound from the blast of a firearm. The output of trigger 74 is connected to the input of a one-shot multivibrator 75. The output of multivibrator 75 is connected to: line 40a; the toggle input of a counter 76; the input of a one-shot multivibrator 78; one of two inputs of an OR gate 80; and the set input of a flip-flop FF-2. The normally open contact of switch 43 is connected via line 43a to: the reset input of counter 76; the second input of OR gate 80; one of two inputs of an OR gate 82; one of two inputs of an OR gate 84; and one of two inputs of an OR gate 86.

Counter 76 comprises a well-known digital binary counter, and is employed herein to count the number of shots fired by a trainee. Each time a signal is provided at the output of multivibrator 75, counter 76 is incremented by a count of one. The output of counter 76 is supplied on lines 54 to an optional display or the optional external equipment. Counter 76 is reset by operation of switch 43.

The output of OR gate 80 is connected to the reset input of flip-flop FF-1. The ONE output of flip-flop FF-1 is connected to one of two inputs of an AND gate 88. The second input of AND gate 88 is connected to the output of a free-running multivibrator 90. The output of AND gate 88 is connected to the toggle input of an elapsed time counter 92.

One-shot multivibrator 78 is employed herein to supply a DISPLAY-ENABLE signal to indicator 49 (FIG. 1) of such a duration (viz., 3 to 10 seconds) that will allow the trainee to briefly see the amount of elapsed time he used to respond to a given target situation. The output of multivibrator 78 is connected to line 50a, and to the reset input of counter 92. The reset input of counter 92 is connected, in a conventional manner, to respond to a negative transition of the DISPLAY-ENABLE signal which is supplied on line 50a. The contents of counter 92, which constitutes the elapsed time value supplied on lines 50b to indicator 49, is briefly displayed by this indicator in response to the DISPLAY-ENABLE signal on line 50a. When the DISPLAY-ENABLE signal makes a negative transition, counter 92 is reset.

The ONE output of flip-flop FF-2 is connected to one of two inputs of an AND gate 94. The second input of AND gate 94 is connected to the output of multivibrator 90. The output of AND gate 94 is connected to the toggle input of a 9-digit binary counter 96. It is the function of counter 96 to count the elements of a single scan-line within camera 30. Note that a 9-digit binary counter has a maximum count value of 512 (viz., $2^9 = 512$), and this is the rationale for operating camera 30 with 512 elements and scan-lines. The contents of counter 96, which constitutes the value for $x_a$, is supplied to a second x-value compare input of comparator 68 via lines 98. A signal, which is indicative of a count of 512 elements and constitutes the SCAN-SYNCHRONIZATION signal, is supplied from counter 96 on line 40b. The SCAN-SYNCHRONIZATION signal has three functions: first, it is supplied to the toggle input of a 9-digit binary counter 100 to thereby effect the count of the number of scan lines; secondly, it is connected to the second input of OR gate 84 to cause counter 96 to reset following a count of 512; and thirdly, it is supplied on line 40b to camera 30 to synchronize the individual scans by the electron beam within the camera. A signal, which is indicative of a count of 512 scan-lines and constitutes the STOP-SCAN signal, is supplied from counter 100 on line 40c. The STOP-SCAN signal also has three functions: first, it is supplied to the second input of OR gate 82 to cause FF-2 to reset and thereby inhibit the advance of counter 96 by disabling AND gate 94; secondly, it is supplied to the second input of OR gate 86 to cause counter 100 to reset following a count of 512; and thirdly, it is supplied to camera 30 via line 40c to stop an image scan. The contents of counter 100, which constitutes the value for $y_a$, is supplied to a second y-value compare input of comparator 68 via lines 102.

As stated hereinabove, a high-amplitude video signal is supplied from camera 30 when the scanning electron beam within the camera intercepts a point of light positionally related to an aperture made in the screen. This signal is supplied on line 42 to the input of a Schmitt trigger 104, which is employed herein as a threshold detector. The output signal from trigger 104, which will hereafter be referred to as an APERTURE-DETECTION signal, is applied to the input of a one-shot multivibrator 106. The output of multivibrator 106 is connected to one of three inputs of an AND gate 108. The output of AND gate 94 is connected to an inverting input of AND gate 108 via line 109. The output of AND gate 108 is connected to the enable input of comparator 68, and the signal supplied from AND gate 108 will hereafter be referred to as a COMPARE-ENABLE signal.

As mentioned hereinabove, a single frame of screen 12 may be used for a plurality of firearms use situations by patching all previous apertures made in the screen. However, target screen patching may be effected electronically by recording the coordinate locations of each aperture previously made in the screen, and not enabling comparator 68 when any such previous aperture location is detected by camera 30. A random access memory (RAM) 110 is disposed for storing any such aperture locations made in screen 12. Lines 98 from counter 96 are connected to the x-address of RAM 110; and lines 102 from counter 100 are connected to the y-address input of RAM 110. Memory 110 may, for example, comprise a type 2048-BIT Dynamic Random Access Memory, Model No. TMS 4020 NC, as manufactured by Texas Instruments, Inc. of Dallas, Texas. Assuming such a memory is employed herein, it is the function of RAM 110 to store a binary one at each previous aperture location, and a binary zero at all other unused coordinate locations.

Lines 112 from comparator 68 are connected to the input of an OR gate 114. The output of OR gate 114 is connected to the "write enable" input of RAM 110. The "write data" input of RAM 110 is connected to a source of plus voltage. The output of one-shot multivibrator 106 is connected to the "read enable" input of RAM 110. The "read data" output of RAM 110 is connected to an inverting input of AND gate 108.

Even though a random access memory has been disclosed as a means for storing the coordinate location values for previous apertures made in screen 12, other circuit devices would be equally suitable. For example, shift registers could be employed for temporarily storing each previous coordinate location value, and a comparator could be employed for comparing the values stored in the shift registers with the instantaneous values contained in counters 96 and 100.

Once the reference coordinate location values are stored in memory 64, and the corresponding film is loaded into projector 10, the system of the present invention is set up for operation. As the film is moved within projector 10, FILM-MOVEMENT-SYNCHRONIZATION signals are supplied on line 38 to increment counter 62. The output of counter 63 addresses each of the reference coordinate location values stored within memory 64 for the corresponding scenes displayed by the projector, and these values are supplied on lines 66, 70, and 72. Assume, for example, that a first scene in a sequence is displayed which requires that the trainee use his firearm. A binary one value is supplied to the set input of flip-flop FF-1 to thereby set this flip-flop. AND gate 88 will be enabled and pulses from multivibrator 90 will pass through AND gate 88 to increment counter 92. Counter 92 will continue to increment until flip-flop FF-1 is reset.

When the sound from the blast of a firearm is detected by microphone 32, a START-RATING signal is supplied to the input of trigger 74 via line 36. The START-RATING signal will be of sufficient magnitude to activate trigger 74 which will, in turn, activate multivibrator 75. The output signal from multivibrator 75 constitutes the START-SCAN signal, and is supplied on line 40a to camera 30. In addition to starting the camera scan operation, the START-SCAN signal performs four functions within the control unit. First, flip-flop FF-1 is reset by the application of the START-SCAN signal via OR gate 80. When flip-flop FF-1 is reset, AND gate 88 is disabled and counter 92 will stop incrementing. Second, multivibrator 78 will generate the DISPLAY-ENABLE signal, which will be supplied on line 50a to indicator 49. The DISPLAY-ENABLE signal is approximately three to ten seconds in duration and at the end of this time duration counter 92 is reset. Third, the START-SCAN signal will increment counter 76 by a count of one. It is the function of counter 76 to count the number of times a firearm is used, and the contents of this counter are provided on lines 54 for external recording. Fourth, the START-SCAN signal will set flip-flop FF-2. The output of flip-flop FF-2 will enable AND gate 94 to pass pulses from multivibrator 90 to the toggle input of counter 96.

Counter 96 will increment to a maximum count of 512 in response to pulses from oscillator 90, and when this counter reaches the maximum count, the SCAN-SYNCHRONIZATION signal is supplied on line 40b. In addition to synchronizing the sweeps of the electron beam in camera 30, the SCAN-SYNCHRONIZATION signal increments counter 100 by a count of one (to count the number of scan-lines), and it resets counter 96 to zero via OR gate 84. When counter 100 reaches a maximum count of 512, the STOP-SCAN signal is supplied on line 40c. In addition to stopping the scan operation of camera 30, the STOP-SCAN signal resets counter 100 to zero via OR gate 86, and resets flip-flop FF-2 via OR gate 82. When flip-flop FF-2 is reset AND gate 94 is disabled, which will thereby prevent oscillator pulses from passing through AND gate 94 to counter 96. It should be pointed out at this juncture that counters 96 and 100 do not stop incrementing when camera 30 detects an aperture in screen 12.

If at any time during the scan operation camera 30 senses infrared light passing through any aperture in the screen, the APERTURE-DETECTION signal is supplied at the output of Schmitt trigger 104. The APERTURE-DETECTION signal will, in turn, activate multivibrator 106. The output of mulitvibrator 106 is a pulse of short duration which will enable comparator 68 when two other conditions are met. First, the output of AND gate 94 is in a negative state (viz., the oscillator pulse is in a negative half-cycle), and no previous aperture is detected at the coordinate location $x_a, y_a$. The application of the COMPARE-ENABLE signal to comparator 68 will effect the comparison operation which will generate a signal on one of lines 48. The structure and operation of comparator 68 will be explained in greater detail hereinbelow.

When the results of the comparison operation are provided on lines 48, a short pulse is simultaneously provided on one of lines 112. This pulse will pass through OR gate 114 to the "write enable" input of RAM 110, and a binary one will be stored in the RAM at an address corresponding the $x_a$ value supplied on lines 98 and the $y_a$ value supplied on lines 102. The binary number is written into the RAM by the application of plus voltage at the "write data" input thereto. Note that comparator 68 is enabled when multivibrator 90 output signal is in a negative half-cycle, and the pulse on one of lines 112 occurs at approximately the same time that the COMPARE-ENABLE signal is applied to the comparator. It is also pointed out that counters 96 and 100 are incremented by a positive transition of multivibrator 90 output signal. Therefore, the "write enable" input to RAM 110 is enabled at a time when counters 96 and 100 still contain values indicative of $x_a$ and $y_a$. This timing relationship will become clearer following the description accompanying FIG. 5 hereinbelow.

Figure 4:
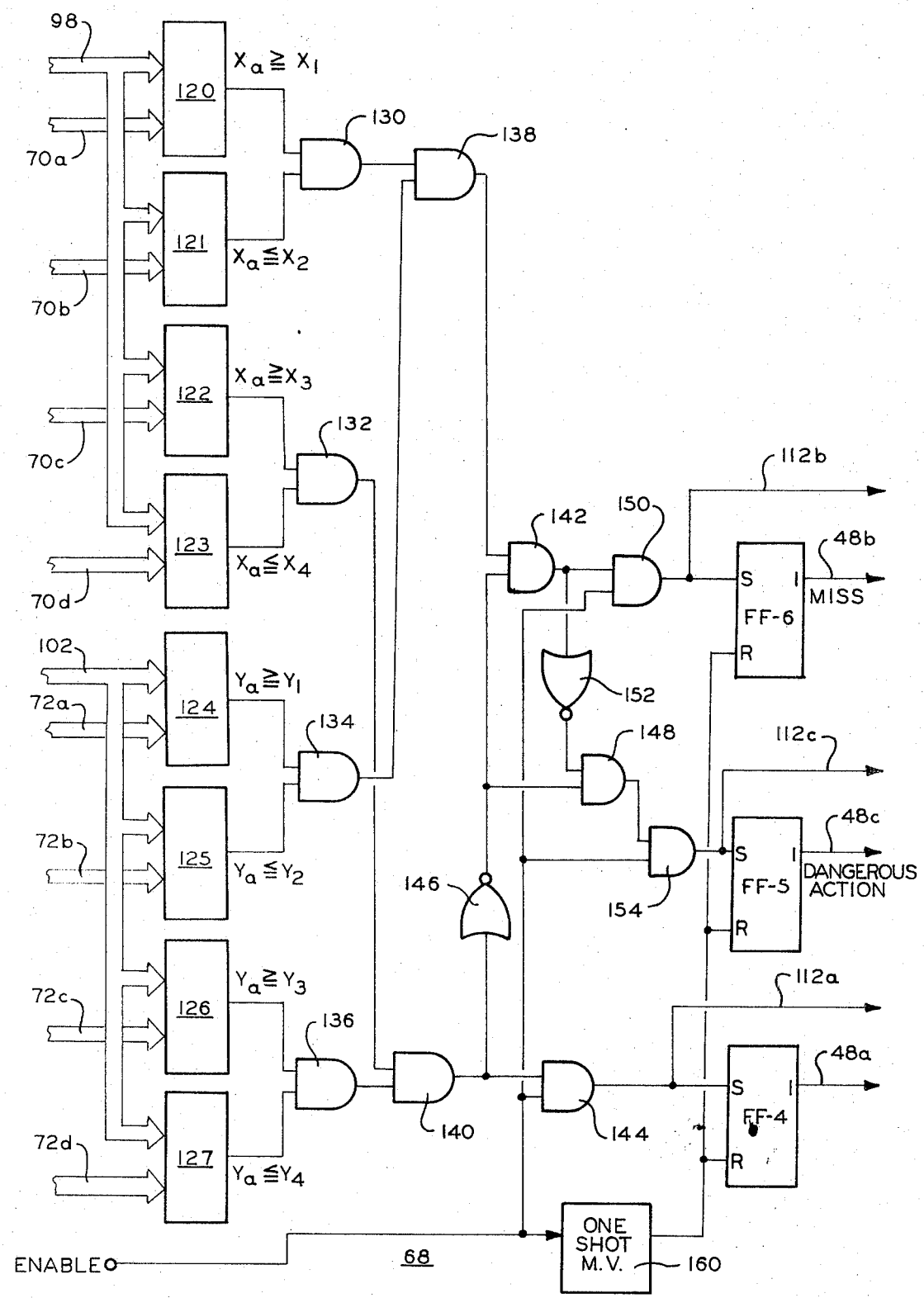
FIG. 4 is a logic-block diagram of the comparator.

With reference to FIG. 4, comparator 68 is illustrated in greater detail. A binary number, which is indicative of the coordinate location of $x_a$, is supplied on lines 98 to an input of binary comparators 120 through 123. A binary number indicative of reference coordinate location $x_1$ is supplied to a second input of binary comparator 120 via lines 70a; a binary number indicative of reference coordinate location $x_2$ is supplied to a second input of binary comparator 121 via lines 70b; a binary number indicative of reference coordinate location $x_3$ is supplied to a second input of binary comparator 122 via lines 70c; and a binary number indicative of reference coordinate location $x_4$ is supplied to a second input of binary comparator 123 via lines 70d.

A binary number, which is indicative of the coordinate location of $y_a$, is supplied on lines 102 to an input of binary comparators 124 through 127. A binary number indicative of reference coordinate location $y_1$ is supplied to a second input of binary comparator 124 via lines 72a; a binary number indicative of reference coordinate location $y_2$ is supplied to a second input of binary comparator 125 via lines 72b; a binary number indicative of reference coordinate location $y_3$ is supplied to a second input of binary comparator 126 via lines 72c; and a binary number indicative of reference coordinate location $y_4$ is supplied to a second input of binary comparator 127 via lines 72d. Binary comparators 120 through 127 may be, for example, combinations of 4-BIT Magnitude Comparators, Model No. SN7485, manufactured by Texas Instruments, Inc. of Dallas, Texas.

An output from comparator 120, which is indicative of $x_a \geq x_1$ is connected to one of two inputs of AND gate 130. An output from comparator 121, which is indicative of $x_a \leq x_2$, is connected to the second input of AND gate 130. An output from comparator 122, which is indicative of $x_a \geq x_3$, is connected to one of two inputs of an AND gate 132. An output from comparator 123, which is indicative of $x_a \leq x_4$, is connected to the second input of AND gate 132. An output from comparator 124, which is indicative of $y_a \geq y_1$, is connected to one of two inputs of an AND gate 134. An output from comparator 124, which is indicative of $y_a \leq y_2$, is connected to the second input of AND gate 134. An output from comparator 126, which is indicative if $y_a \geq y_3$, is connected to one of two inputs of an AND gate 136. An output from comparator 127, which is indicative of $y_a \leq y_4$, is connected to the second input of AND gate 136.

The output of AND gate 130 is connected to one of two inputs of an AND gate 138. The output of AND gate 134 is connected to the second input of AND gate 138. The output of AND gate 132 is connected to one of two inputs of an AND gate 140. The output of AND gate 136 is connected to the second input of AND gate 140. The output of AND gate 138 is connected to one of two inputs of an AND gate 142. The output of AND gate 140 is connected to one of two inputs of an AND gate 144, and to an input of an inverter 146. The output of inverter 146 is connected to the second input of AND gate 142, and to one of two inputs of an AND gate 148. The output of AND gate 142 is connected to one of two inputs of an AND gate 150, and to the input of an inverter 152. The output of inverter 152 is connected to the second input of AND gate 148. The output of AND gate 148 is connected to one of two inputs of AND gate 154. The second input of AND gates 144, 150, and 154 is connected to the "enable" input of comparator 68.

The "enable" input of the comparator is also connected to the input of a one-shot multivibrator 160. The output of multivibrator 160 is connected to the reset input of flip-flops FF-4, FF-5, and FF-6. The reset input of flip-flops FF-4, FF-5, and FF-6 are connected, in a conventional manner, to respond to a negative transition of the signal from multivibrator 160. The output of AND gate 144 is connected to the set input of flip-flop FF-4; the output of AND gate 154 is connected to the set input of flip-flop FF-5; and, the output of AND gate 150 is connected to the set input of flip-flop FF-6. The ONE output of flip-flop FF-4 is connected to line 48a; the ONE output of flip-flop FF-5 is connected to line 48c; and, the ONE output of flip-flop FF-6 is connected to line 48b. The output of AND gate 144 is connected to line 112a; the output of AND gate 150 is connected to line 112b; and, the output of AND gate 154 is connected to line 112c. Lines 112a, 112b, and 112c constitute lines 112 referred to generally hereinabove.

In operation, the values of the binary numbers provided on lines 98 and lines 70a through 70d are compared within binary comparators 120 through 123. Similarly, the values of the binary numbers supplied on lines 102 and lines 72a through 72d are compared within binary comparators 124 through 127. The results of the comparison operations within binary comparators 120 through 127 activate the circuitry connected thereto for generating a signal on one of lines 48a, 48b, or 48c indicative of the evaluation of the trainee's use of his firearm.

The operation of the circuitry shown in FIG. 4 is best illustrated by way of example. Assume that the trainee's response to the target scene depicted in FIG. 2 is detected at coordinate location $x_a, y_a$. Also assume that this response was detected when rectangles 55 and 56 define the target areas. The reference coordinate locations $x_1, x_2, x_3$, and $x_4$ are supplied from memory 64 via lines 70; and reference coordinate locations $y_1, y_2, y_3$, and $y_4$ are supplied from the membory via lines 72. The values for coordinate location $x_a, y_a$ are supplied on lines 98 and 102 from counters 96 and 100, respectively. As may be seen from the diagram in FIG. 2, $x_a > x_3$, $x_a < x_4$, $y_a > y_3$, and $y_a < y_4$. With these conditions, the output of comparators 122, 123, 126, and 127 will be at a high level; which will enable AND gates 132 and 136. This will enable AND gate 140, which will in turn disable AND gates 142 and 148 via inverter 146. When the COMPARE-ENABLE signal is provided at the "enable" input of the comparator AND gate 144 will be enabled, and a pulse is supplied on line 112a. Flip-flop FF-4 will be set, and a signal will be supplied on line 48a indicative of a HIT also, the COMPARE-ENABLE signal will activate multivibrator 160. However, flip-flop FF-4 will not be reset until the output signal from multivibrator 160 makes a negative transition, which will be approximately 3 to 10 seconds after the COMPARE-ENABLE signal is applied to the "enable" input of the comparator. Therefore the HIT indication signal will illuminate indicator 44 for approximately 3 to 10 seconds.

Assume, for example, that the aperture at coordinate location $x_a, y_a$ was detected when rectangle 55' and 56" define the target areas. The reference coordinate locations $x_1', x_2', x_3'$, and $x_4'$ are supplied from memory 64 via lines 70; and reference coordinate locations $y_1', y_2', y_3'$, and $y_4'$ are supplied from the memory via lines 72. The coordinate location values $x_a, y_a$ are again supplied via lines 98 and 102. As may be seen from the diagram in FIG. 2, $x_a > x_1'$, $x_a < x_2'$, $y_a > y_1'$, and $y_a < y_2'$. With these conditions, the output of comparators 120, 121, 124, and 125 will be at a high level; which will enable AND gates 130 and 134. This will enable AND gate 138, which will provide a high-level output signal therefrom. With these same conditions, AND gate 140 will be disabled, and the output of inverter 146 will be at a high level. AND gate 142 will thereby be enabled, since both inputs thereto are now at a high level, and AND gate 148 will be disabled by a low-level signal applied via inverter 152. When the COMPARE-ENABLE signal is applied to the "enable" input of the comparator, AND gate 150 will be enabled which will supply a pulse on line 112b, and flip-flop FF-6 will be set. The MISS indication signal will illuminate indicator 45 for approximately 3 to 10 seconds. If the coordinate location $x_a, y_a$ is detected without rectangle 56, or an aperture is detected in the absence of any target areas defined by reference coordinate location values, neither AND gate 138 nor AND gate 140 will be enabled. With these conditions, AND gate 148 will be enabled via the application of low-level signals to the input of inverters 146 and 152. When the COMPARE-ENABLE signal is applied to the "enable" input of the comparator, AND gate 154 will be enabled which will supply a pulse on line 112c, and flip-flop FF-5 will be set. The DANGEROUS ACTION indication signal will illuminate indicator 46 for approximately three to ten seconds before flip-flop FF-5 is reset by the negative transition of the signal from multivibrator 160.

It should be pointed out at this juncture that the number of disparate trainee evaluation ratings may be changed from the exemplary HIT, MISS, and DANGEROUS ACTION ratings to a greater number of ratings by changing the complexity of the comparator, and changing the number of reference coordinate locations stored in memory 64. For example, an expansion to ten disparate ratings of marksmanship evaluation would permit training with a projected image of the traditional bulls-eye pattern having ten disparate levels of gradation. Such an expansion would not depart from the spirit and scope of the present invention.

In summary of the description of the comparator, it may be readily seen that the aperture coordinate location values $x_a$ and $y_a$ are compared with the reference coordinate location values $x_1, y_1; x_2, y_2; x_3, y_3;$ and $x_4, y_4$ in accordance with equations (1), (2), and (3) given hereinabove. A HIT indication is generated in response to the output of AND gate 132 and the output of AND gate 136, which function is effected by AND gate 140. A MISS indication is generated in response to the output of AND gate 130 and the output of AND gate 134 and no HIT indication was generated, which functions are effected by AND gate 138, inverter 146, and AND gate 142. A DANGEROUS ACTION indication is generated where neither a HIT nor a MISS indication are generated. This is effected by means of inverters 146 and 152 in combination with AND gate 148.

Figure 5:
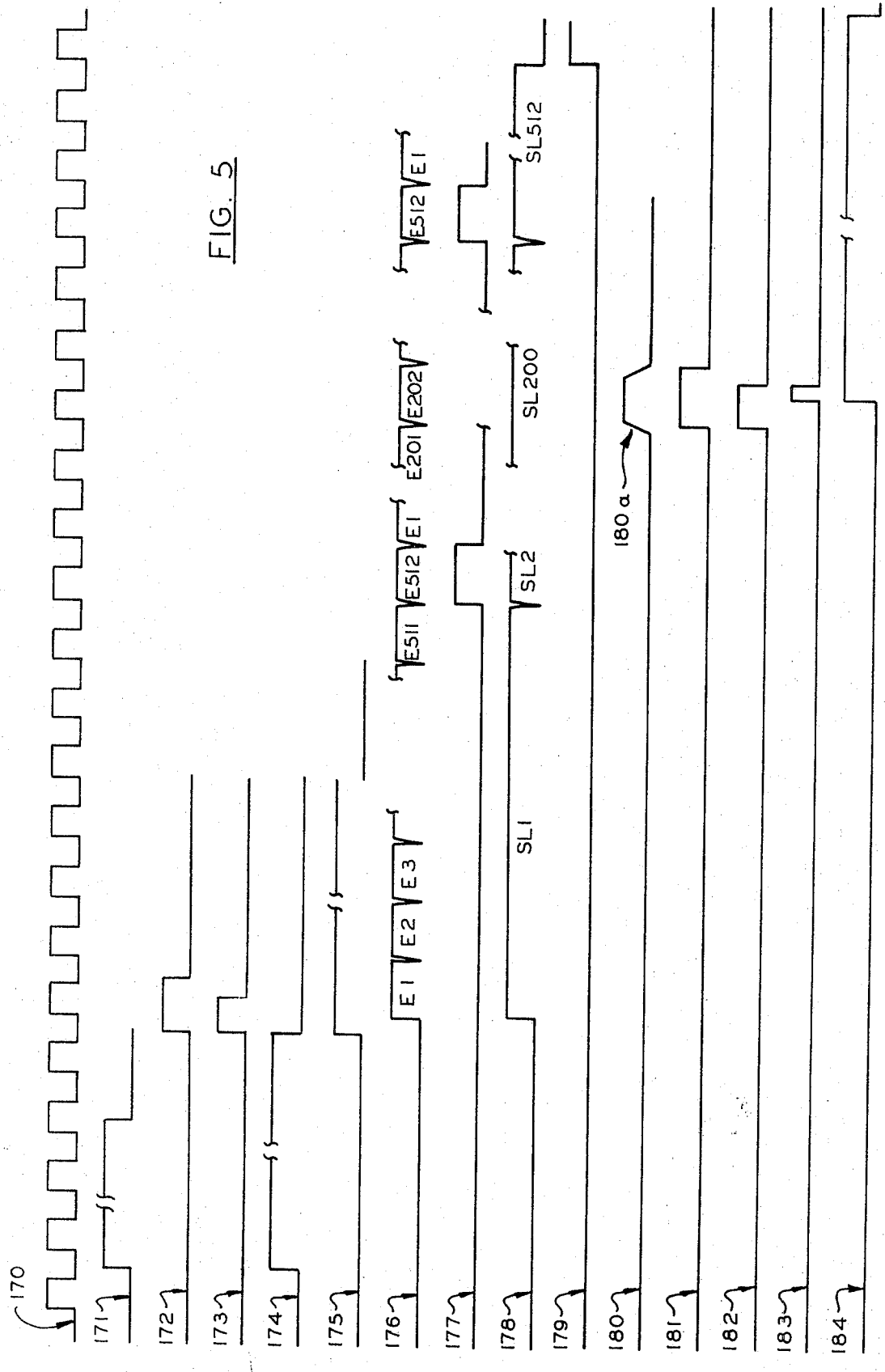
FIG. 5 is a timing diagram of the system of the present invention.

The timing relationship of the circuitry discussed hereinabove is shown in detail in FIG. 5. Waveform 170 illustrates the voltage changes with respect to time provided at the output of multivibrator 90. It is pointed out that waveform 170 is illustrated as one continuous chain of pulses for simplification of the timing diagram; however, as will be seen in the remaining waveforms, discontinuities in the drawings are made to reduce the size of the timing diagram. Waveform 171 illustrates the single binary one value retrieved from memory 64 on line 66, which binary one initiates the operation of elapsed time counter 92 as a result of displaying a first scene in a series of scenes requiring that the trainee use his firearm.

Waveform 172 illustrates the signal at the output of trigger 74 in response to microphone 32 detecting the blast of a firearm, and waveform 173 illustrates the START-SCAN signal provided at the output of multivibrator 75 in response to the signal illustrated by waveform 172 being applied to the input of this multivibrator. Waveform 174 illustrates the reset and set operation of flip-flop FF-1 for controlling the incrementation of counter 92; that is, the negative portion of this waveform indicates that the flip-flop is reset and the positive portion thereof indicates that the flip-flop is set and counter 92 is incrementing. Flip-flop FF-1 is set in response to the positive transition of the signal shown by waveform 171, and it is reset by the positive transition of the START-SCAN signal shown by wave form 173. When flip-flop FF-1 is reset incrementation of counter 92 is stopped. However, the count value reached by the counter will be held for display and external recording until the counter is subsequently reset.

Waveform 175 illustrates the DISPLAY-ENABLE signal which is provided at the output of multivibrator 78. Multivibrator 78 is activated by the START-SCAN signal, and this multivibrator generates the DISPLAY-ENABLE signal for a time duration of approximately three to ten seconds. As explained hereinabove, counter 92 is reset by the negative transition of the DISPLAY-ENABLE signal in order that a new elapsed time value may be counted for a subsequent firearms use situation.

The START-SCAN signal (waveform 173) sets flip-flop FF-2 which thereby enables AND gate 94 to pass multivibrator pulses (waveform 170) through to the toggle input of counter 96. Waveform 176 illustrates the incrementation of counter 96 in response to the positive transitions of the multivibrator pulses (waveform 173). The progressive values of counter 96 are represented within waveform 176 by E1, E2, E3, . . . E511, E512, etc., for elements 1 through 512, respectively. Waveform 177 illustrates the SCAN-SYNCHRONIZATION signal which makes a positive transition when counter 96 has reached a count of 512. Waveform 178 illustrates the incrementation of counter 100 in response to the positive transitions of the SCAN-SYNCHRONIZATION signal. It should be noted that counter 100 is reset to a value of one in lieu of zero since counter 96 must increment to a value of 512 before counter 100 is incremented. Therefore, counter 100 will contain a value of one during the time at which counter 96 is counting the elements of the first scan-line. Scan-lines are designated within waveform 178 by SL1, SL2, . . . SL200, . . . SL512 for scan-lines 1 through 512, respectively. Waveform 179 illustrates the STOP-SCAN signal generated at a time when counter 100 reaches a count of 512. More particularly, waveform 179 makes a positive transition when waveform 178 makes a negative transition following a count of 512.

Waveform 180 illustrates the video signal supplied by camera 30, and portion 180a of this waveform represents an exemplary high-amplitude pulse generated in response to the camera sensing infrared light passing through an aperture made in screen 12. The video signal (waveform 180) is applied to the input of trigger 104, and waveform 181 illustrates the APERTURE-DETECTION signal provided at the output of this trigger in response to the high-amplitude pulse (portion 180a). Waveform 182 illustrates the signal provided at the output of multivibrator 106 in response to the APERTURE-DETECTION signal. Waveform 183 illustrates the COMPARE-ENABLE signal provided at the output of AND gate 108. Note that waveform 183 makes a positive transition when waveform 183 is positive AND waveform 170 is at a low level. Also, it is assumed for this particular example that no previous aperture has been made in the screen, and therefore the "read data" output of RAM 110 is at a low level.

Waveform 184 illustrates the signal provided at the output of multivibrator 160 in response to the COMPARE-ENABLE signal. This signal makes a positive transition when the COMPARE-ENABLE signal (waveform 183) makes a positive transition. The time duration of multivibrator 160 may be set for approximately three to ten seconds which time duration is provided to allow sufficient time for the trainee to see his marksmanship rating following his action. When waveform 184 makes a negative transition flip-flops FF-4, FF-5, or FF-6 are reset.

To summarize the operation of the structure disclosed hereinabove, assume the following conditions:

TABLE I

| Coordinate Location Value | In Decimal Form | In Binary Form |
| --- | --- | --- |
| $x_a$ | 202 | 0011001010 |
| $y_a$ | 200 | 0011001000 |
| $x_1$ | 80 | 0001010000 |
| $y_1$ | 65 | 0001000001 |
| $x_2$ | 345 | 0101011001 |
| $y_2$ | 300 | 0100101100 |
| $x_3$ | 180 | 0010110100 |
| $y_3$ | 150 | 0010010110 |
| $x_4$ | 280 | 0100011000 |
| $y_4$ | 225 | 0011100001 |

When memory 64 is addressed for the target scene under discussion (viz., the scene shown in FIG. 2), the binary numbers representative of $x_1$, $x_2$, $x_3$, and $x_4$ are supplied to the comparator via lines 70, and the binary numbers representative of $y_1$, $y_2$, $y_3$, and $y_4$ are supplied to the comparator via lines 72. The contents of counters 96 and 100 are supplied to the comparator via lines 98 and lines 102 respectively. When counter 96 has incremented to a binary number of 0011001010 (E202) and counter 100 has incremented to a binary number of 0011001000 (SL200), a high-amplitude pulse (represented by portion 180a of waveform 180) is supplied from trigger 104 to multivibrator 106. The COMPARE-ENABLE signal is subsequently provided at the output of AND gate 180 when the output of AND gate 94 is at a low level and the "read data" output of RAM 110 is also at a low level.

As may be seen from the values given hereinabove for the respective coordinate location values, $x_a>x_3$, $x_a<x_4$, $y_a>y_3$, and $y_a<y_4$. This will generate high-level output signals from binary comparators 122, 123, 126, and 127. AND gates 132 and 136 are enabled which will enable AND gate 140. When the COMPARE-ENABLE signal and the high-level output of AND gate 140 are applied to the two inputs of AND gate 144, flip-flop FF-4 will be set and a high-level pulse will be supplied on line 112a to the input of OR gate 114. The resulting high-level output of OR gate 114 will enable RAM 110 to enter a binary one at a storage location corresponding to the binary numbers applied at the address inputs via lines 98 and lines 102. This binary one entered into RAM 110 will be employed to preclude the generation of the COMPARE-ENABLE signal when this aperture is sensed by the camera during subsequent scanning operations.

When flip-flop FF-4 is set, a high-level signal will be supplied on line 48a to illuminate indicator 44. Also, this high-level output signal from flip-flop FF-4 will be employed in the external recording equipment to record the trainee's marksmanship. The COMPARE-ENABLE signal activates multivibrator 160, and approximately three to ten seconds later when the output of this multivibrator makes a negative transition flip-flop FF-4 will be reset.

At this juncture of the description it is pointed out that the signals generated by control unit 34, namely HIT, MISS, DANGEROUS ACTION, and elapsed time for response may be combined within the optional external equipment (e.g., a computer) to compute an overall index of trainee performance. This index of performance would provide a measure of the three most significant trainee performance characteristics; namely, accuracy, response time, and judgment. One possible equation for computing an overall score, or index of performance is as follows:

INDEX OF PERFORMANCE = $\Sigma$HITS + ($\Sigma$MISSES/2) $-$ $\Sigma$DANGEROUS ACTIONS $^2/\Sigma$RESPONSE TIMES Therefore, the objective for the trainee is to maximize his index of performance by scoring as many HITS as possible, and the fewest DANGEROUS ACTIONS while responding rapidly.

SECOND EMBODIMENT OF THE PRESENT INVENTION

Figure 6:
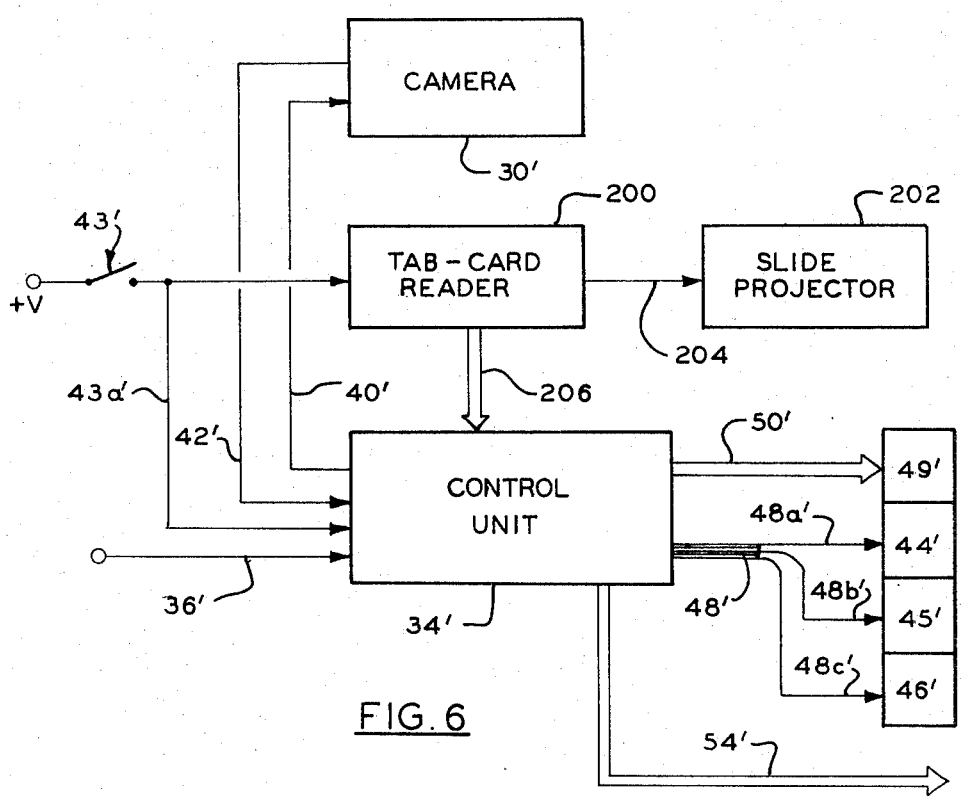
FIG. 6 is a block diagram of a second embodiment of the present invention.

FIG. 6 is a block diagram of a second embodiment of the present invention. A data tab card reader 200 is employed for reading the reference coordinate location values from tab cards, and a slide projector 202 is employed for displaying scenes of firearms use situations. Switch 43' is connected between a source of plus voltage and reader 200; and in particular, the operating terminal of switch 43' is connected to plus voltage and the normally open contact thereof is connected to the start switch (not shown) of reader 200. An output signal is supplied from reader 200 via line 204 to projector 202, which signal is indicative of a tab card present within the read station (not shown) of reader 200. This signal is employed within projector 202 for causing an individual slide, within a given sequence of slides, to be moved into the projection station (not shown).

The reference coordinate location values read from a tab card are supplied to control unit 34' via lines 206. Control unit 34' is substantially the same as control unit 34 disclosed hereinabove. The primary difference between these two control units in the use of a simpler storage means 65' in control unit 34', which will be explained in greater detail with the description hereinbelow accompanying FIG. 7. Line 43a' is connected between the normally open contact of switch 43' and control unit 34' for resetting the control unit upon closure of the switch. LIne 36' is connected between the microphone (not shown) and the control unit for providing a signal indicative of the blast of a firearm.

Line 40' is connected between control unit 34' and camera 30' for conducting the START-SCAN, SCAN-SYNCHRONIZATION, and STOP-SCAN signals. Camera 30' may be the same as that described hereinabove for camera 30. The video signal from camera 30' is supplied to control unit 34' via line 42'. Indicator 49', which is employed for displaying trainee response time, is connected to the control unit by means of lines 50'. Indicator 44', which is employed for displaying a HIT rating, is connected to the control unit by means of line 48a. Indicator 45', which is employed for displaying a MISS rating, is connected to the control unit by means of line 48b'. Indicator 46', which is employed for displaying a DANGEROUS ACTION rating, is connected to the control unit by means of line 48c'. Line 54' supplies the value for the total number of shots fired, and may be connected to external equipment (not showwn), or to a display device (not shown).

Figure 7:
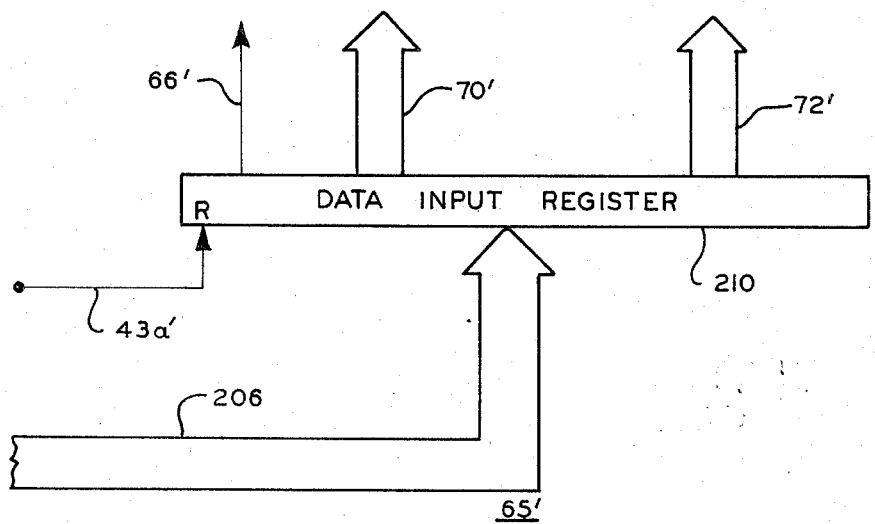
FIG. 7 is a block diagram of a storage means employed within the second embodiment.

With reference to FIG. 7 storage means 65', which is employed within control unit 34', is shown in greater detail. It is pointed out that storage means 65' is directly replaceable for storage means 65 (as shown in FIG. 3) to complete the structure of control unit 34'. A data input register 210 is employed as a temporary storage device for data read from tab cards by reader 200. Register 210 comprises a plurality of flip-flops connected in the well-known manner for constructing registers. Lines 206, from reader 200, are connected to the individual set inputs of the flip-flops contained within register 210. Line 43a' is connected to all the individual reset inputs of the flip-flops of register 210. The ONE output of the first flip-flop of register 210 is connected to line 66'. The ONE output of the next 10 flip-flops of register 210 are connected to lines 70'. The ONE output of the remaining ten flip-flops of register 210 are connected to lines 72'.

In operation, switch 43' is operated to start a cycle of operation. Register 210 is reset by the application of a pulse on line 43a' which also resets control unit 34', and causes a data tab card to be moved within the reading station (not shown) of reader 200. A signal is thereby supplied on line 204 to projector 202 to move a single film transparency into the reading station (not shown) of projector 202. The data read from the tab card is supplied to control unit 34', and in particular to register 210. This data is temporarily stored in register 210 as the reference coordinate location values. When the signal indicative of the microphone detecting the blast of a firearm is supplied to control unit 34' via line 36', the operation of the control unit is performed in the same manner as that described hereinabove under the DESCRIPTION OF THE PREFERRED EMBODI- MENT. Camera 30' likewise operates in the same manner as that described hereinabove.

The present invention may be utilized in conjunction with more complex training systems such as those which include a computer for controlling a plurality of projectors to provide branching from one sequence of target scenes to another as a result of a trainee's action, and larger memories for providing greater flexibility of target scenes. Also, a closed-circuit television recording and playback system may be included in a more complex system to facilitate post-enactment evaluation of a trainee's response to given situations. A printer may also be included as a computer output device for providing a detailed analysis and summary of the trainee's performance. However, the system which has been described hereinabove has been simplified for ease of understanding the invention.

Accordingly, it may be appreciated from the discussion hereinabove of two embodiments of the present invention that a simulator has been disclosed for training personnel in the use of firearms. However, the embodiments disclosed are but exemplary of the spirit of the invention. Others may modify the disclosed embodiments by changing the details, components, and arrangement of parts without departing from the invention. It is therefore intended that such modifications to the invention be covered by the breadth and scope of the subjoined claims hereinbelow.

What I claim is:

1. In a process for simulating firearms use situations wherein a trainee discharges a firearm at a screen on which a target is displayed and a projectile penetrates the screen, a method of automatically scoring the trainee's response, comprising the steps of:
   a. providing first electrical signals defining at least one area of the target displayed on the screen;
   b. directing electromagnetic radiation toward one side of said screen to pass through any aperture therein made by the fire projectile;
   c. detecting radiation passing through said aperture to generate a second electrical signal indicative of the location of said aperture; and
   d. comparing the value of said first electrical signals with said second electrical signal to determine the degree of correlation between said aperture location and said target area.

2. The method as defined in claim 1, wherein said detecting step includes scanning said screen in a two-dimensional raster pattern having M scan-lines of N elements per scan-line.

3. In a target practice system, apparatus for determining the locations of projectile penetrations into a target, comprising:
   a. means defining a two-sided projection screen of such a material and thickness as to be penetrable by a projectile;
   b. means for displaying a target image on one side of said screen;
   c. means for directing electromagnetic radiation, having wavelengths which reside within a limited band, toward one side of said screen so as to pass through any aperture existing therein; and
   d. detection means, responsive only to said radiation within said limited band, for sensing radiation passing through any such aperture and providing electrical output signals indicative of the location of said aperture.

4. The apparatus as defined in claim 3, wherein said detection means is a television camera generating output signals representative of the location of any such aperture, and said apparatus further includes:
   a. means for providing electrical reference signals indicative of a defined target area; and
   b. comparison means coupled to said camera for determining the degree of correlation between any such aperture and said target area.

5. The apparatus as defined in claim 4, wherein said displaying means is a projector for projecting visible light target images from film.

6. The apparatus as defined in claim 5, wherein said limited band includes infrared radiation.

7. A training apparatus for firearms use, comprising:

a. means defining a two-sided target of such a material and thickness as to be penetrable by a projectile;
   b. means for directing electromagnetic radiation toward one side of said target so as to pass through any aperture existing therein;
   c. detection means responsive to said radiation passing through any such aperture to generate output signals indicative of the location of any such aperture;
   d. reference means for providing electrical signals defining areas of said target; and
   e. comparison means coupled between said detection means and said reference means for determining the degree of correlation between any such aperture and said defined areas.

8. The apparatus as defined in claim 7, wherein said electromagnetic radiation includes light having wavelengths residing within the infrared region.

9. The apparatus as defined in claim 8, wherein said detection means is a television camera disposed to view the other side of said target and having a two-dimensional scan raster with M scan-lines of N elements per scan-line.

10. The apparatus as defined in claim 9, further including:
    a. means fror sensing the discharge of a firearm;
    b. an element-counting means having an incrementation input coupled to said sensing means and a first output coupled to a first input of said comparison means, whereby the count value at said first output of said element-counting means is an element $x_a$ residing within the range of a count of O to N and is representative of the first-dimensional location of said aperture;
    c. a scan-line-counting means having an incrementation input coupled to a second output of said element-counting means indicative of a count value of N and a first output coupled to a second input of said comparison means, whereby the count value at said first output of said scan-line counting means is a scan-line $y_a$ residing within the range of a count value of 1 to M and is representative of the second-dimensional location of said aperture;
    d. means coupled said sensing means to said television camera for starting the detection operation thereof;
    e. means coupling said second output of said element-counting means to said television camera for synchronizing the detection operation thereof; and f. means coupling a second output of said scan-line counting means indicative of a count value of M to said television camera for stopping the detection operation thereof, whereby said television camera starts detection operation in response to actuation of a firearm, synchronizes scan-line detection in response to counting N elements, and stops detection operation in response to counting M scan-lines.

11. The apparatus as defined in claim 10, further including means for displaying an image visible on said other side of the target which image includes said defined areas therewithin.

12. The apparatus as defined in claim 11, wherein said reference means is a memory addressable by said displaying means and having a first output coupled to a third input of said comparison means and a second output coupled to a fourth input of said comparison means, whereby said reference electrical signals are retrieved from said memory in accordance with images displayed by said displaying means.

13. The apparatus as defined in claim 12, wherein said comparison means comprises:
 a. a gating network having an enable input thereto coupled to said television camera for operation in response to said output signal from said television camera and having inputs thereto and outputs therefrom, wherein said outputs being the output of said comparison means and being indicative of the degree of correlation between said aperture and said defined areas;
 b. a plurality of binary comparators having a first input coupled to said first input of said comparison means, a second input coupled to said third input of said comparison means, and outputs therefrom coupled to a first of said inputs to said gating network; and
 c. a plurality of binary comparators having a first input coupled to said second input of said comparison means, a second input coupled to said fourth input of said comparison means, and outputs therefrom coupled to a second of said inputs of said gating network.

14. The apparatus as defined in claim 13, further including a storage means addressable by said first output of said element counting means and said first output of said scan-line counting means, said storage means having an output therefrom coupled to said enable input of said gating network and having a write-enable input coupled to said outputs of said gating network for storing the location of previous ones of said apertures, whereby said gating network is inoperative upon detection of previous ones of said apertures.

15. The apparatus as defined in claim 14, further including:
 a. a time counting means having an incrementation input thereto and a count value output therefrom;
 b. a source of oscillatory voltage; and
 c. a gating means coupled between said incrementation input of said time counting means and said source of oscillatory voltage, said gating means having an enable input coupled to a third output of said memory and a disable input coupled to said sensing means, whereby said gating means enables said oscillatory voltage to increment said time counting means upon retrieval of data from said third output of said memory and said gating means disables incrementation of said time counting means upon sensing the discharge of said firearm.

16. In a training apparatus for firearms use of the type wherein a screen is disposed for projectile penetration, and wherein said screen has displayed thereon images including therewithin at least one defined target area, the improvement comprising:
 a. means for directing electromagnetic radiation toward one side of said screen so as to pass through any aperture existing therein;
 b. detection means responsive to said radiation and disposed for detecting radiation passing through any such aperture, and generating output signals representative of the location of any such aperture;
 c. means for providing electrical reference signals indicative of said defined target area; and
 d. comparison means coupled to said detection means and said providing means for determining the degree of correlation between any such aperture and said defined target area.

17. In a training apparatus for firearms use of the type wherein a screen is disposed for projectile penetration, and wherein said screen has displayed thereon images including therewithin at least one defined target area, the improvement comprising:
 a. means for directing electromagnetic radiation toward one side of said screen so as to reflect said radiation from said screen except where an aperture exists therein;
 b. detection means responsive to said radiation and disposed for detecting radiation passing through any such aperture, and generating output signals representative of the location of any such aperture;
 c. means for providing electrical reference signals indicative of said defined target area; and
 d. comparison means coupled to said detection means and said providing means for determining the degree of correlation between any such aperture and said defined target area.

* * * * *